United States Patent [19]

Yukawa

[11] Patent Number: 5,475,492
[45] Date of Patent: Dec. 12, 1995

[54] OBJECT EXTRACTING METHOD

[75] Inventor: Noriaki Yukawa, Nara, Japan

[73] Assignee: Matsushita Electric Industrial Co., Ltd., Osaka, Japan

[21] Appl. No.: 95,211

[22] Filed: Jul. 23, 1993

Related U.S. Application Data

[63] Continuation-in-part of Ser. No. 78,052, Jun. 18, 1993, abandoned.

[30] Foreign Application Priority Data

Jun. 19, 1992 [JP] Japan ..................... 4-160759

[51] Int. Cl.⁶ .................... G01B 11/00; G06K 9/38
[52] U.S. Cl. ........................... 356/401; 382/168
[58] Field of Search .................. 356/401, 394; 382/51

[56] References Cited

U.S. PATENT DOCUMENTS 5,138,671 8/1992 Yokoyama .................. 382/51

FOREIGN PATENT DOCUMENTS 2753593 8/1978 Germany .................. 356/394

OTHER PUBLICATIONS

Translation of German Patent 2,753,953, Kuni et al Aug. 1978.
"Image Processing Application Technique", Tanaka et al., Jun. 20, 1989, pp. 42–45, Kogyo Chosakai Publishing Co., Ltd.

Primary Examiner—Richard A. Rosenberger
Assistant Examiner—K. P. Hantis
Attorney, Agent, or Firm—Wenderoth, Lind & Ponack

[57] ABSTRACT

An object extracting method of extracting a position of an object in a to-be-inspected region through an image processing, includes the steps of obtaining a plurality of density values of brightness from the to-be-inspected region, converting the density value which is larger or smaller than a preset threshold value into a specified value, integrating the density values at an X or Y coordinate on a Y or X axis, projecting the integrated density values at the X or Y axis, and extracting the position of the object present in the to-be-inspected region based on change of the integrated density values.

5 Claims, 8 Drawing Sheets

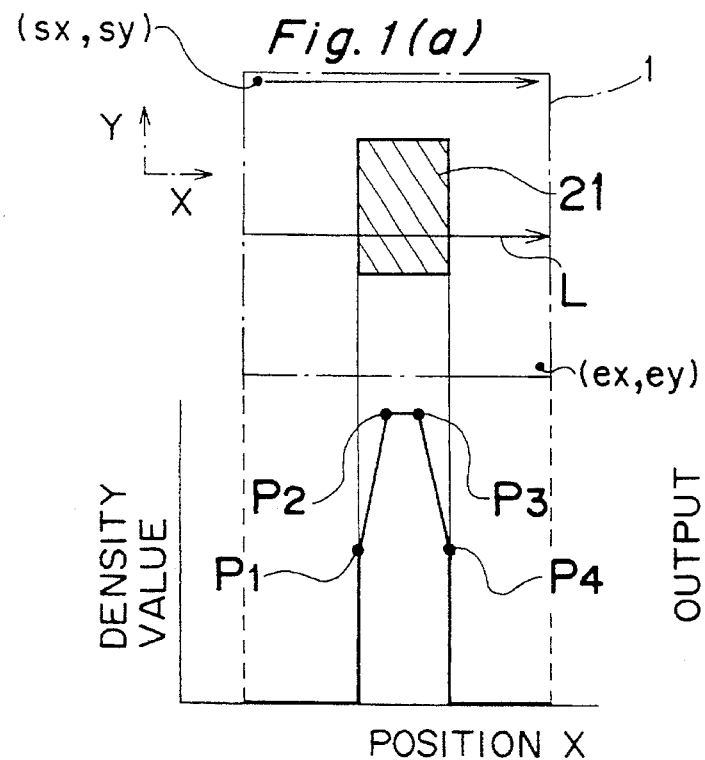
Fig. 1(a)
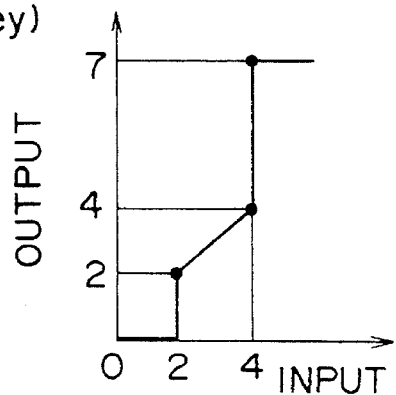
Fig. 1(c)
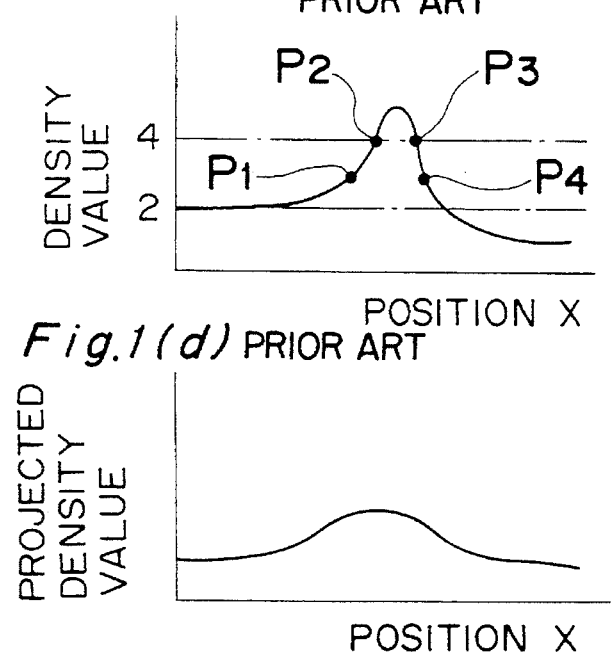
Fig. 1(b) PRIOR ART
Fig. 1(d) PRIOR ART
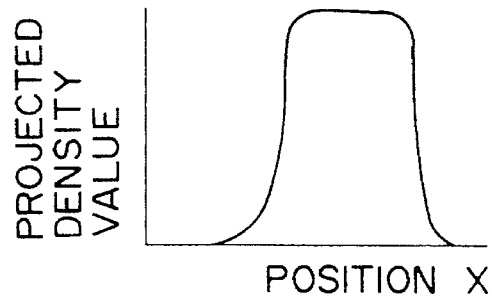
Fig. 1(e)

PROJECTION ALONG
ARROW DIRECTION

OBJECT EXTRACTING METHOD

CROSS-REFERENCE TO RELATED APPLICATIONS

This application is a Continuation-In-Part application of U.S. patent application Ser. No. 08/078,052, now abandoned, filed Jun. 18, 1993, entitled "OBJECT EXTRACTING METHOD".

BACKGROUND OF THE INVENTION

The present invention relates to an object extracting method of extracting a position of an object in a specified region to be inspected through image processing.

During the manufacturing process of various kinds of products such as semiconductor wafers, etc., the position where an object on the surface of the product is present is often extracted in a manner of an image processing in order to read out an indicia, for example, a symbol or the like assigned to the product. The position of a defect, etc. on the surface of the product is also extracted in many cases through an image processing.

In such cases as above, the light is projected to the surface to be inspected, thereby to obtain the density value at each position of the surface through an image processing.

The density value for each position is integrated and then projected on the X and Y axes. In other words, the density value at each position along the Y axis is integrated and then projected onto the X axis, and the density value at each position along the X axis is integrated and then projected onto the Y axis. FIG. 7 is a diagram showing an example of density values expressed by using any of 0–7 in 8 gray scale on a specified region 1 shown in FIG. 1(a) and projected density values based on the density values in the conventional method. More concretely, supposing that the density values at each of ten points on the Y axis in the Y coordinate ($y_1$) are the levels (1, 3, 2, 4, 5, 6, 4, 1, 2, 1), the integrated result of the levels is 29 and then projected as the coordinate value on the Y axis ($\Sigma(y_1)$=29). On the other hand, if the density values at each of the ten points on the Y axis in the next Y coordinate ($y_2$) are the levels (1, 1, 2, 2, 1, 3, 1, 3, 2, 1), the integrated sum 17 is projected as the coordinate value on the Y axis ($\Sigma(y_2)$=17). The above procedure is repeated not only for the Y axis, but for the X axis, whereby a projection graph as shown in FIG. 9 is obtained on the image. In the drawing, reference numeral 1 is a specified region, i.e. a surface to be inspected and $2_1$, $2_2$, $2_3$ are objects (symbols A, B, C) to be extracted. In the example of FIG. 9, dotted lines show the result of the conventional method while solid lines show the result of the present invention described later. In FIG. 9, since the density of the object 2 is higher than that of the ground of the surface 1, a section including XY coordinate regions $R_{x1}$, $R_{x2}$, $R_{x3}$, $R_y$ where the level of the integrated density value is high is determined and extracted as the existing place of the object 2.

In the above-described method, if the object has a small contrast, the position of the object 2 cannot be extracted or erroneously detected due to the influence of noise present in the to-be-inspected surface 1, i.e., the influence of the change of the density not resulting from the existence of the object. That is, erroneous recognition is caused. More specifically, in the foregoing example, although the density value at all points where the object 2 is not present is supposed to be the level 1, there may appear and be included in the integrated sum the density value of a higher level (level 2 or 3) due to the noise. In consequence, the integrated value $\Sigma(y_2)$ of the density value at the Y coordinate $y_2$ is not ten times the level 1, but becomes 15 because of the inclusion of the high-level density value (level 2 and level 3). Therefore, while the integrated value $\Sigma(y_1)$ of the density value at a point $y_1$ on the Y coordinate where the object 2 is present is 29, the integrated value $\Sigma(y_2)$ of the density value at a point $y_2$ on the Y coordinate where the object 2 is not present becomes 15. Since the difference of the integrated values is as small as 14, it results erroneous recognition.

SUMMARY OF THE INVENTION

The object of the present invention is therefore to provide an object extracting method through image processing which does not accompany erroneous recognition even when an object has poor contrast.

In accomplishing these and other objects, according to the first aspect of the present invention, there is provided an object extracting method of extracting a position of an object in a to-be-inspected region through an image processing, comprising the steps of: obtaining a plurality of density values of brightness from an image of the to-be-inspected region picked up by an image pick-up device; converting the density value which is larger or smaller than a preset threshold value into a specified value; integrating the density values at an X coordinate on a Y axis or a Y coordinate on an X axis; projecting the integrated density values on the selected axis; and extracting the position of the object present in the to-be-inspected region based on change of the integrated density values.

According to the second aspect of the present invention, there is provided an object extracting method of extracting a position of an object in a to-be-inspected region through an image processing, comprising the steps of: obtaining a plurality of density values of brightness from an image of the to-be-inspected region picked up by an image pick-up device; converting the density value which is larger than a preset upper threshold value into a specified upper value and converting the density value which is smaller than a preset lower threshold value into a specified lower value, one of the threshold values being set for the object and the other of the threshold values being set for a region other than the object so that the density value of the object is clearly different from that of the region other than the object; integrating the density values at an X coordinate on a Y axis or a Y coordinate on an X axis; projecting the integrated density values on the selected axis; and extracting the position of the object present in the to-be-inspected region based on change of the integrated density values.

According to the present invention, the density value which is larger or smaller than the preset threshold value is converted into the specified value. Therefore, the difference of the integrated value of the density values where the object is present from the integrated value of the density values where the object is not present is magnified, thus preventing erroneous recognition.

BRIEF DESCRIPTION OF THE DRAWINGS

These and other objects and features of the present invention will become clear from the following description taken in conjunction with one preferred embodiment thereof with reference to the accompanying drawings, in which:

FIG. 1(a) is a density characteristic diagram obtained from an object extracting method according to a first embodiment of the present invention;

FIG. 1(b) is a density characteristic diagram in a conventional processing method;

FIG. 1(c) is an input/output characteristic diagram showing a look-up table in a data conversion process with upper and lower threshold values set in the embodiment;

FIG. 1(d) is a graph showing relationship between positions and projected density values after projection of the diagram of FIG. 1(b);

FIG. 1(e) is a graph showing relationship between positions and projected density values after projection of the diagram of FIG. 1(a);

DETAILED DESCRIPTION OF THE EMBODIMENT

Figure 1F:
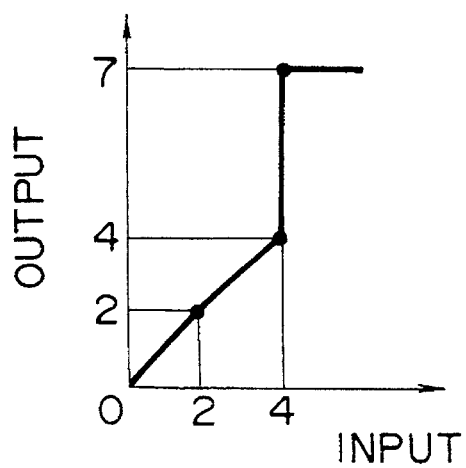
FIG. 1(f) is an input/output characteristic diagram in a data conversion process with an upper threshold value set in the embodiment.

Before the description of the present invention proceeds, it is to be noted that like parts are designated by like reference numerals throughout the accompanying drawings.

A preferred embodiment of the present invention will be depicted hereinbelow.

Figure 4:
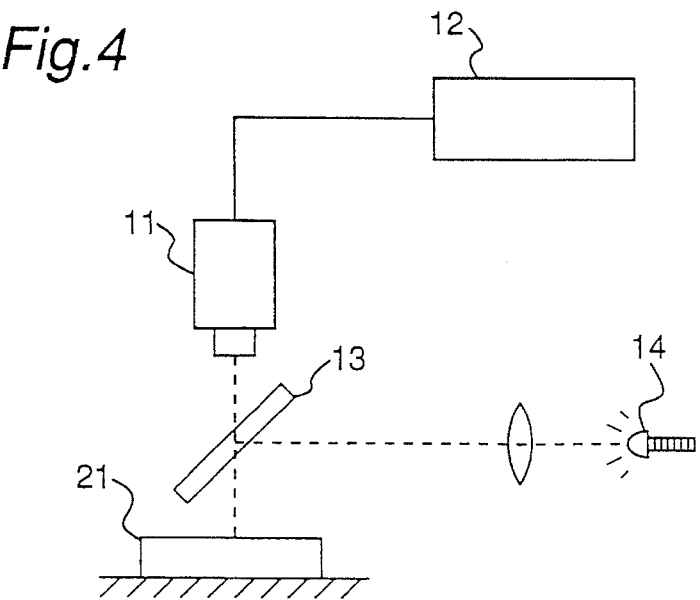
FIG. 4 is a schematic view showing an object extracting apparatus for carrying out the object extracting method according to the first embodiment of the present invention.
Figure 5:
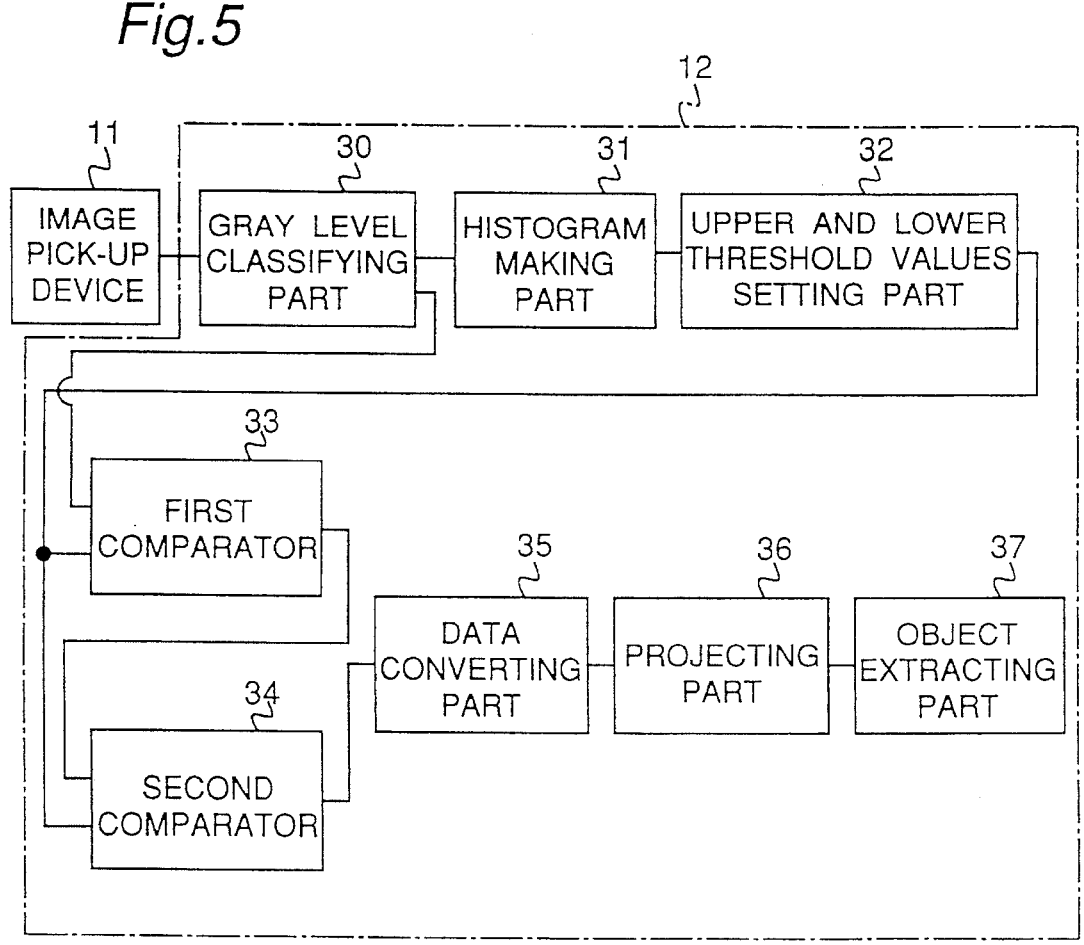
FIG. 5 is a block diagram of the object extracting apparatus.

FIG. 4 is a schematic view showing an object extracting apparatus for carrying out an object extracting method according to a first embodiment of the present invention. FIG. 5 is a block diagram of the object extracting apparatus. As shown in FIG. 4, a to-be-inspected object 21 is illuminated by light emitted from a light source 14 and then reflected by a half mirror 13. An image pick-up device such as a camera 11 picks up the image of the illuminated object 21 through a scanning operation as shown by an arrow in FIG. 1(a) to take image data into an image processing apparatus 12 for carrying out a predetermined process based on the image data.

As shown in FIG. 5, the image processing apparatus 12 includes a gray level classifying part 30, a histogram making part 31 an upper and lower threshold values setting part 32 a first comparator 33, a second comparator 34, a data converting part 35, a projecting part 36, and an object extracting part 37.

The operation of these parts 30–37 will be described below with reference to FIG. 6.

Figure 6:
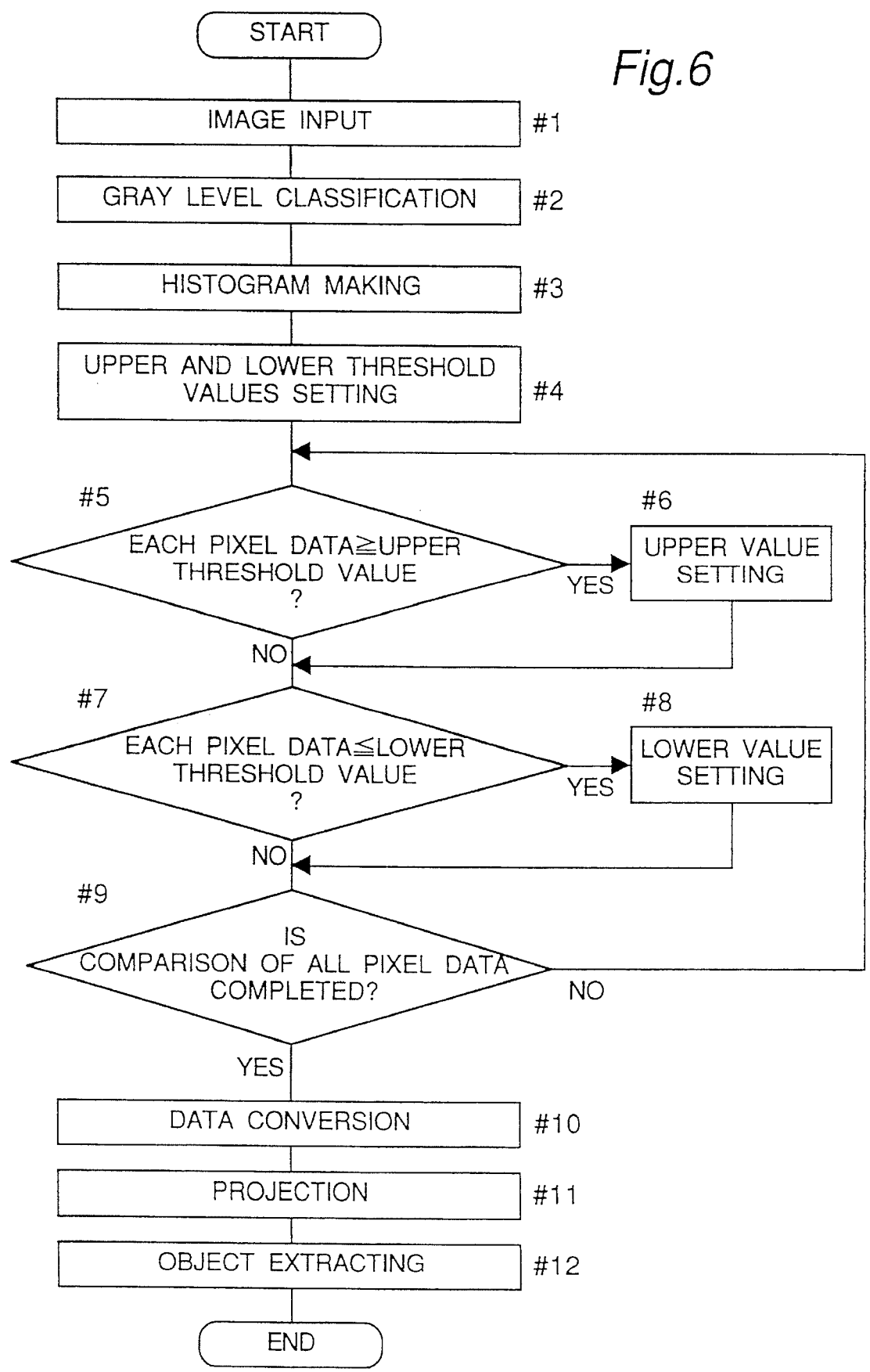
FIG. 6 is a flowchart showing operations of the object extracting apparatus.

In FIG. 6, at step #1, a specified region 1 including the object 21 which is shown by a dashed line in FIG. 1(a) is scanned along each line to input the image data of the region 1 at each pixel of total 100 pixels (=10×10) into the image processing apparatus 12. The image data of the region 1 may be inputted at every other pixel. Such a scanning operation is performed from a starting point (sx, sy) to an ending point (ex, ey) in FIG. 1(a). For example, in a specified region with pixels of 40,000 pixels (=200×200), if the image data is picked up and inputted by every other pixel, the image data at pixels of 10,000 pixels (=100×100) in total are inputted.

At step #2, the inputted image data are classified by the gray level classifying part 30 so that the density values of the image data may be expressed by using any of 0–7 in 8 gray scale. Then, the density values at the pixels are stored with their position data expressed by X-Y coordinates in a memory (not shown). In this condition, a graph in FIG. 1(b) is drawn with the density values with respect to the X coordinate. FIG. 1(d) shows a graph in a case where a projection operation is performed with respect to the X coordinate based on the graph in FIG. 1(b). In FIG. 1(d), the difference between darkness and brightness is not so clear.

Figure 3:
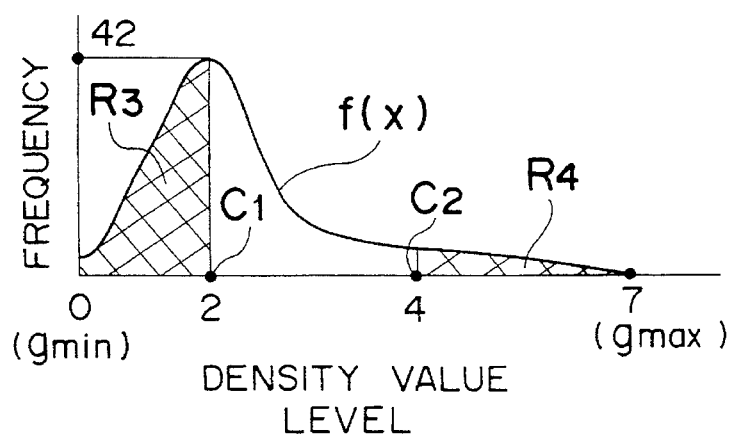
FIG. 3 is a frequency characteristic diagram in execution of the embodiment of the present invention.

At step #3, a histogram is made by the histogram making part 31 based on the stored density values. FIG. 3 shows an example of such a histogram with respect to the X coordinate. In this histogram, the total number of frequencies is 100 (=10×10) which is the total number of pixels in the region 1.

At step #4, on the basis of the histogram made, an upper threshold value $C_2$ and a lower threshold value $C_1$ are determined by the upper and lower threshold values setting part 32. The manner for determined the upper and lower threshold values $C_2$ and $C_1$ in the histogram will be described below. In the histogram, a density value at the highest frequency, for example, the density value of 2 at the highest frequency of 42 in FIG. 3, is treated as a reference density value. When $\alpha$ is an arbitrary value and $\alpha>0$, a density value of the ratio of $\alpha$ is set as the upper threshold value $C_2$. For example, in FIG. 3, if $\alpha=2$, the upper threshold value $C_2$ is set to be 4. It may be considered to be certain that there is the object 21 within a cross-hatching region $R_4$ having density values equal to or more than the upper threshold value $C_2$. When $\beta$ is an arbitrary value and $\beta>0$, a density value of the ratio of $\beta$ is set as the lower threshold value $C_1$. For example, in FIG. 3, if $\beta=1$, the lower threshold value $C_1$ is set to be 2. It may be considered to be certain that there is not the object 21 within a cross-hatching region $R_3$ having density values equal to or less than the lower threshold value $C_1$. The upper threshold value is set as 7 when the upper threshold value $C_2$ is more than 7 depending on the reference density value and the value of $\alpha$.

At step #5, the first comparator 33 compares each density value having the position data with the upper threshold value $C_2$. When the density value is equal to or more than the upper threshold value $C_2$, a predetermined upper value, for example, the maximum gray level of 7, is set instead of the density value at the position for emphasizing the gray level at step #6. When the density value is less than the upper threshold value $C_2$ at step #5, the second comparator 34 compares each density value having the position data with the lower threshold value $C_1$ at step #7. When the density value is equal to or less than the lower threshold value $C_1$, a predetermined lower value, for example, the minimum gray level of 0, is set instead of the density value at the position for emphasizing the gray level at step #8. When the density value is less than the upper threshold value $C_2$ or more than the lower threshold value $C_1$, the density value is used without changing. In FIG. 6, although the programming proceeds to step #7 after step #6, the programming may proceed to step #9 without steps #7 and 8. The processing at steps #7 and 8 may be carried out prior to that at steps #5 and 6.

At step #9, a determination is made as to whether or not the above comparing operation has been carried out on all of the pixels. If not, the comparing operation at steps #5–8 is continued until the operation is completed on all of the pixels. When the operation is completed, the program proceeds to step #10.

At step #10, on the basis of the comparison results of the first and second comparators 33 and 34, the data converting operation is performed by the data converting part 35 so that the density value at each pixel is converted into the upper value or lower value, or the density value itself is used without changing. Based on the histogram in FIG. 3, the result of such data converting operation is shown in FIG. 1(a) with respect to the X coordinate.

At step #11, based on the converted density values, a graph is formed by the projecting part 36, and then the density values at the X and Y coordinates are respectively integrated through the projecting operation. As a result, a graph of FIG. 1(e) is obtained with respect to the X coordinate. In this graph, each portion darker than the lower threshold value $C_1$ is converted into 0, while each portion brighter than the upper threshold value $C_2$ is converted into 8, thus, obtaining clear darkness and brightness as compared with the graph in FIG. 1(d).

At step #12, based on the graph projected, the object 21 is extracted from the specified region 1 in accordance with the portions having higher brightness in the graph by the object extracting part 37.

Next, the detail operation for extracting the object from the specified region will be described using an example.

Figure 1G:
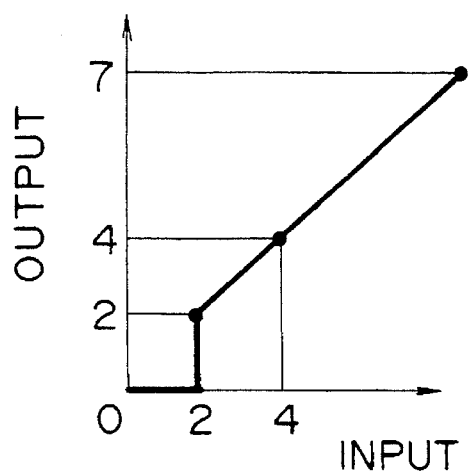
FIG. 1(g) is an input/output characteristic diagram in a data conversion process with a lower threshold value set in the embodiment.
Figure 7:
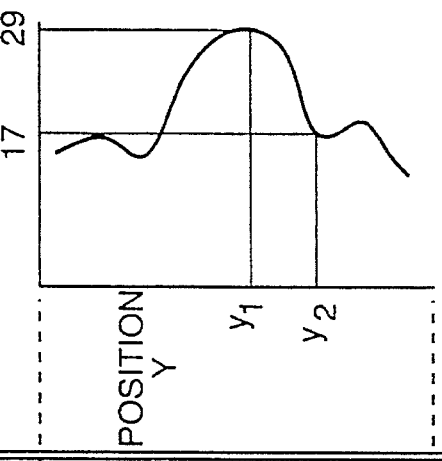
FIG. 7 is a diagram showing an example of density values expressed by using any of 0–7 in 8 gray scale and projected density values based on the density values in the conventional method.
Figure 7:
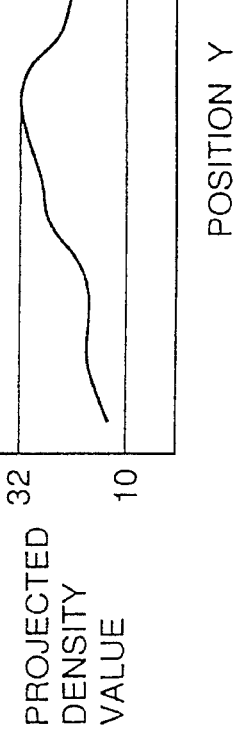
Figure 8:
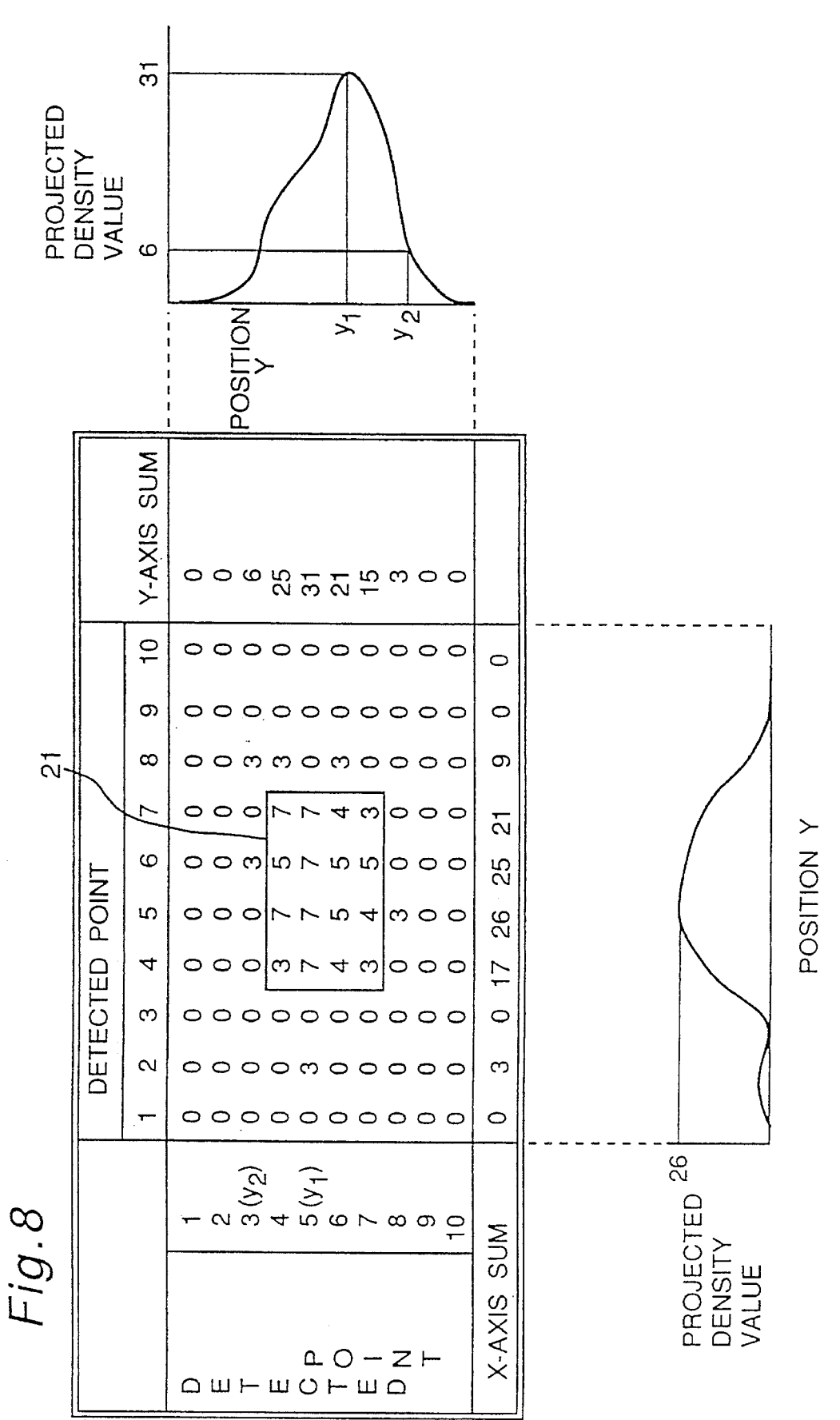
FIG. 8 is a diagram showing an example of density values expressed by using any of 0–7 in 8 gray scale and projected density values based on the density values in the first embodiment.
Figure 9:
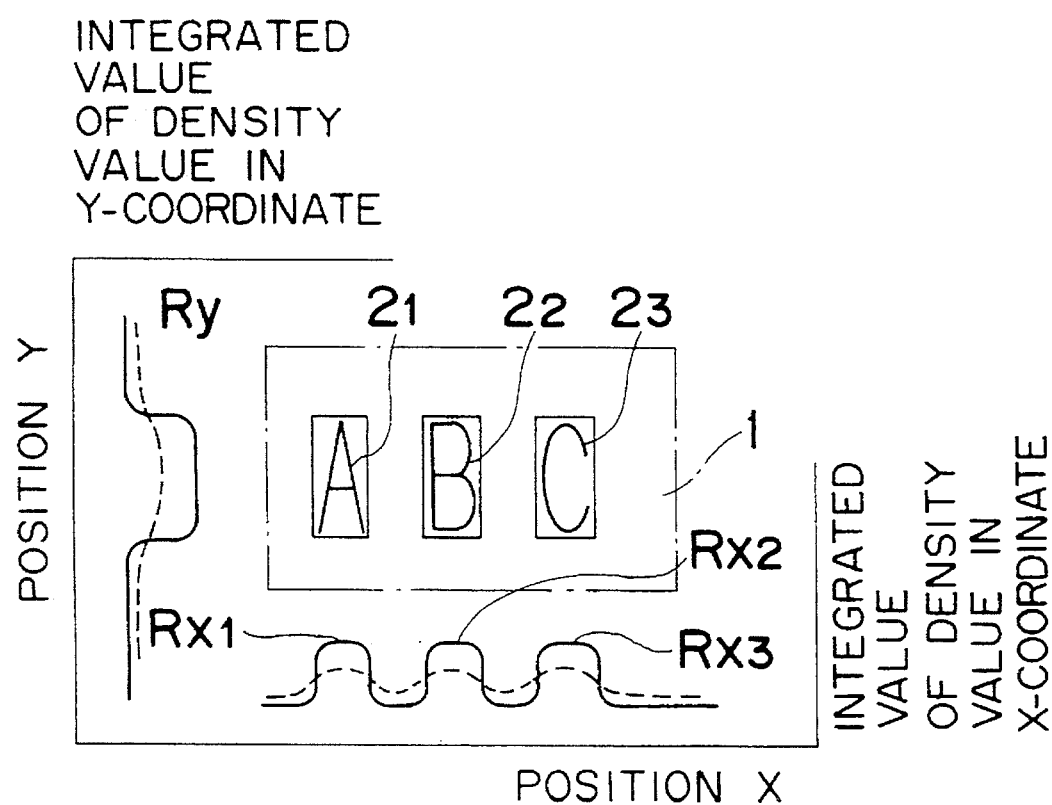
FIG. 9 is a diagram for explaining the principle of the present invention.

In the first place, the light is projected onto the surface in the specified region to be inspected of a semiconductor wafer, and then the density value of brightness at each position of the surface of the semiconductor wafer is obtained through the above operations of the image processing at steps #1 and 2 in FIG. 6. The density value of each position is integrated and then projected on each of the X axis and the Y axis at step #3. When the density value is processed and projected on the X and Y axes, an upper threshold value and a lower threshold value are respectively set to be 4 and 2 at step #4. The density value is subjected to a data conversion process so that when each of the density values is expressed by using any of 1–7 in 8 gray scale (tone), at steps #5–9, the maximum density value 7 is assigned to the density value not smaller than the upper threshold value 4, and the minimum density value 0 is given to the density value not larger than the lower threshold value 2. The density values may be expressed by using any of 0–255 in 256 gray scale, instead of the above 8 gray scale, as described previously. The conversion process at step #10 will be described more in detail with reference to FIG. 1. Assuming that the density value at each position on the X coordinate is indicated in FIG. 1(b) when an object 21 is scanned along a line L, which passes through the 7th point, as shown in FIG. 1(a) at one of ten points on the Y axis. After the density value at each position is subjected to the conversion process, the input of the actually measured density value is generated as such an output as plotted by a bold line in FIG. 1(c). Accordingly, each density value after the conversion process becomes as represented in FIG. 1(a). In other words, the density value at each position changes up and down while the light is projected from the ground in the region 1 traverses the object 21 and returns again to the ground in the region 1. Before the light reaches a point P1 in FIG. 1(b), the output is the level 0 since the input is totally not larger than 2. Then, the input exceeds the level 2 to be smaller than the level 4 before the light moves to a point P2, and therefore, the output is the same level as the input. Further, since the input is totally not smaller than the level 4 before the light reaches a point P3, the output becomes the level 7. The input is over the level 2 and smaller than the level 4 before the light reaches a succeeding point P4, and the output is turned to the same level as the input. Thereafter, the input is not larger than the level 2, so that the output becomes the level 0. The points P1–P4 have the following meanings because it is unclear that the object is certainly present within the region of from point P1 to the point P4 as shown in FIG. 1(a). The object seems to be certainly present within the region of from point P2 to the point P3. The object seems not to be certainly present within the region on the left side of the point P1 and the region on the right side of the point P4. It is unclear whether or not the object is present within the region of from the point P1 to the point P2 and the region of from the point P3 to the point P4. In this manner, the density value at ten points on the Y axis is obtained at each position on the X axis. For instance, shown in FIG. 1(a) in the case where the density values at each of the ten points on the Y axis in the Y coordinate ($y_1$) where the object 21 is present are the levels (1, 3, 2, 4, 5, 6, 4, 1, 2, 1) as shown in FIG. 7, the density values are changed to the levels (0, 3, 0, 7, 7, 7, 7, 0, 0, 0) respectively by the conversion process which is in turn integrated and then projected at step #11 as shown in FIG. 8. That is, the integrated value $\Sigma(y_1)$ of the density values in the coordinate $y_1$ where the object 21 is present is converted to 31 in the conversion process although it would be 29 without the conversion. Meanwhile, the density value at each of the ten points on the Y axis in the Y coordinate ($y_2$) where the object 21 is not present is the levels (1, 1, 2, 2, 1, 3, 1, 3, 2, 1) as shown in FIG. 7 and the integrated value is 17, which is converted to the levels (0, 0, 0, 0, 0, 3, 0, 3, 0, 0) through the conversion process and integrated and then projected as the integrated value $\Sigma(y_1)=6$ at step #11 as shown in FIG. 8. The projection onto the X axis is performed in the same manner as above. The maximum and minimum density values in the conversion process are not always restricted to 4 and 2, and are suitably selected depending on the case.

A section including the X-Y coordinate region of a high integrated value of the density values in the obtained projection graph is extracted and determined as the place where the object 21 is present in the to-be-inspected region 1 at step #12.

Figure 2A:
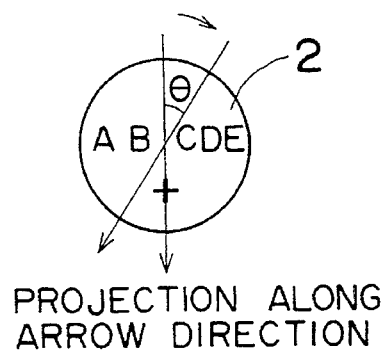
FIG. 2(a) is a diagram for explaining how a second embodiment of the present invention is utilized to detect a rotating position.
Figure 2B:
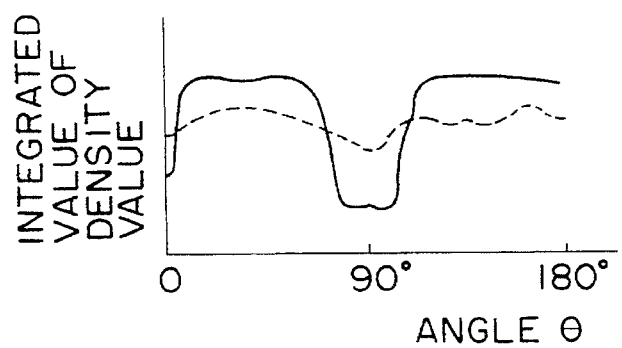
FIG. 2(b) is a graph showing the relationship between the integrated value of the density values and the angles.

According to the extracting method of the embodiment, not only the linear positional data, but the angular data can be obtained in a manner as will be described below in order, for example, to control the attitude (rotating angle) of a button cell with reference to a symbol marked on the rear face thereof. As shown in FIG. 2(a), the cell is scanned along lines passing the center of the cell 2 in a direction of an arrow, thereby to obtain the projection values. As the angle $\theta$ in the scanning direction is changed from 0° to 180°, the density value at each rotating angle (rotating position) is integrated, the result of which is shown in a diagram of FIG. 2(b). FIG. 2(b) indicates the result of the values of 0°–180°. In this case, since the characters "ABCDE" and the symbol "+" have light absorption characteristics, the density value becomes lower than that of the ground. Therefore, the integrated values of the density values are low in the scanning direction (90°) traversing the whole of the characters "ABCDE" and in the direction (0°) longitudinally traversing the symbol "+". The integrated value of the density values changes greatly as shown by a solid line in FIG. 2(b) when the value is subjected to the conversion process, while the integrated value of the density values changes little as represented by a broken line without the conversion process executed. The rotating angle (rotating position) of the object 21 can be thus detected.

It is needless to say that from the statistical viewpoint, the density value of a level typical of the object is generated with a higher frequency where the object is present, and the density value of a level typical of the ground of the to-be-inspected region is generated with a higher frequency where the object is not present. Therefore, before a threshold value is to be set at step #4, first, the occurrence frequency of the density value is counted for the whole area of the image or the partial area of the image of the to-be-inspected region, whereby a histogram of FIG. 3 is obtained at step #3.

If the area (B) of the object 21 is previously found, the following to equations may be used to find the upper and lower threshold values $C_2$ and $C_1$. The graph of the histogram is expressed as follows:

$$\int_{c_2}^{g_{max}} f(x)dx = aA \quad (1)$$
$$\text{where } a > 0$$

$$\int_{g_{min}}^{c_1} f(x)dx = bA \quad (2)$$
$$\text{where } b > 0$$

A lower end region $R_3$ of the counting number i.e. cumulative number corresponding to the ratio (B/A) of the area (B) of the object to the area (A) of the to-be-inspected specified region is where the density value of a level typical of the object is detected with a higher frequency. Therefore, a higher end density value $C_1$ of the lower end region $R_3$ is set as the lower threshold values. Moreover, since a higher end region $R_4$ of the counting number of the ratio corresponding to the ratio [(A-B)/A] of the area (A-B) where the object is not present to the area (A) of the to-be-inspected region is where the density value of a level typical of the ground where the object is not present is generated with a higher frequency, a lower end density value $C_2$ of the higher end region $R_4$ is set as the upper threshold value. Table 1 shows the relationship between the density values and frequency in FIG. 7.

TABLE 1

| DENSITY VALUE | FREQUENCY |
|---|---|
| 0 | 2 |
| 1 | 34 |
| 2 | 42 |
| 3 | 9 |
| 4 | 7 |
| 5 | 5 |

TABLE 1-continued

| DENSITY VALUE | FREQUENCY |
|---|---|
| 6 | 1 |
| 7 | 0 |
|  | 0 |
| TOTAL | 100 |

For instance, if the area of the object 21 is 4×4=16, A=16 is substituted in the above equations (1) and (2).

$$\int_{c_2}^{g_{max}} f(x)dx = a \times 16 \quad (3)$$

$$\int_{g_{min}}^{c_1} f(x)dx = b \times 84 \quad (4)$$

In Table 1, the total density value from 4 to 7 is 7+5+1=13. Then, the ratio $\alpha$ is found as follows: $\alpha=(13/16)=0.81\approx 0.8$. If $\alpha=0.8$, $C_2\approx 4$. The total density value from 0 to 2 is 2+34+42=78. Then, the ratio $\beta$ is found as follows: $\beta=(78/84)=0.93\approx 0.9$. If $\alpha=0.9$, $C_1\approx 2$.

It is not necessarily required to set the upper and lower threshold values in the present invention, and either of the upper and lower threshold values may be enough. In such case, the conversion process is performed so that the density value larger than the upper threshold value is increased as shown in FIG. 1(d) where an upper threshold value is set as 4 and in FIG. 1(e) where a lower threshold value is set as 2, and the density value smaller than the lower threshold value is decreased.

Furthermore, although the density values of brightness are obtained from the to-be-inspected region in the embodiment, density values of darkness may be obtained from it instead.

According to the present invention, the data conversion process is performed so that each density value may be enlarged and/or made smaller to a specific density value while a preset threshold value is rendered a reference in the projection process. Because of this conversion process, the difference between the integrated value of the density values where the object is present and the integrated value of the density values where the object is not present is magnified, thus suppressing the influence of noise upon the inspecting result and making it easy to avoid erroneous recognition. When the upper and lower threshold values are set and the maximum density value is assigned to the density value not smaller than the upper threshold value, with the minimum density value being assigned to the density value not larger than the lower threshold value, the difference of the integrated values of the density values is more enlarged, and a more favorable result is obtained. When the present method is to be carried out, if the threshold values are set from a histogram of the density value based on the ratio of the areas between the to-be-inspected region and the object, the threshold values can be set easily with improved rationality and enhanced convenience and certainty.

Although the present invention has been fully described in connection with the preferred embodiment thereof with reference to the accompanying drawings, it is to be noted that various changes and modifications are apparent to those skilled in the art. Such changes and modifications are to be understood as being included within the scope of the present invention as defined by the appended claims unless they depart therefrom.

What is claimed is:

1. As object extracting method of extracting a position of an object in a to-be-inspected region through an image processing, comprising the steps of:

obtaining a plurality of density values of brightness from an image of the to-be-inspected region picked up by an image pick-up device;

converting the density value which is larger than a present first threshold value into a specified upper value and converting the density value which is smaller than a preset second threshold value into a specified lower value, the preset first threshold being higher than the preset second threshold, one of the threshold values being set for the object and the other of the threshold values being set for a region other than the object so that the density value of the object is clearly different from that of the region other than the object;

integrating the density values at an X coordinate on a Y axis or a Y coordinate on an X axis;

projecting the integrated density values on the selected axis; and extracting the position of the object present in the to-be-inspected region based on differences in adjacent integrated density values.

2. The object extracting method as claimed in claim 1, wherein the maximum density value is assigned to the density value not smaller than the first threshold value, while the minimum density value is assigned to the density value not larger than the second threshold value.

3. The object extracting method as claimed in claim 1, wherein in the converting step, the threshold values are set from a histogram of the density values based on a ratio of an area of the to-be-inspected region and an area of the object.

4. The object extracting method as claimed in claim 3, wherein values at which cumulative frequencies correspond to the area of the object and the region other than the object are set as the threshold values.

5. The object extracting method as claimed in claim 1, wherein the density values are obtained together with positional data in the obtaining step; and the converting step comprises steps of making a histogram based on the density values, setting the threshold value on the basis of the histogram, and changing in the specified value the density value which is larger or smaller than the preset threshold value.

* * * * *